(12) United States Patent
O'Neal, IV

(10) Patent No.: US 6,795,814 B1
(45) Date of Patent: Sep. 21, 2004

(54) SYSTEM AND METHOD FOR CMOS INTEGRATION

(75) Inventor: Frank W. O'Neal, IV, McCook Lake, SD (US)

(73) Assignee: Gateway, Inc., Poway (*) Notice: Subject to any disclaimer, the term of this patent is extended or adjusted under 35 U.S.C. 154(b) by 474 days.

(21) Appl. No.: 09/735,127

(22) Filed: Dec. 12, 2000

Related U.S. Application Data

(63) Continuation-in-part of application No. 09/630,404, filed on Aug. 2, 2000, which is a continuation-in-part of application No. 09/562,870, filed on May 1, 2000, now abandoned, which is a continuation-in-part of application No. 09/090,118, filed on Jun. 4, 1998, now Pat. No. 6,080,207, which is a continuation-in-part of application No. PCT/US99/08095.
(60) Provisional application No. 60/247,461, filed on Nov. 9, 2000.

(51) Int. Cl.$^7$ .............................................. G06F 15/00
(52) U.S. Cl. ...................... 706/11; 717/174; 717/175
(58) Field of Search ............................ 706/1–60, 11; 717/174, 175

(56) References Cited

U.S. PATENT DOCUMENTS

| | | | | |
|---|---|---|---|---|
| 5,103,498 A | * | 4/1992 | Lanier et al. ................. | 706/58 |
| 5,227,614 A | * | 7/1993 | Danielson et al. .......... | 235/380 |
| 5,894,571 A | * | 4/1999 | O'Connor ...................... | 713/2 |
| 5,963,743 A | * | 10/1999 | Amberg et al. ............. | 717/174 |
| 5,991,543 A | * | 11/1999 | Amberg et al. ............. | 717/175 |
| 5,995,757 A | * | 11/1999 | Amberg et al. ............. | 717/175 |
| 6,038,399 A | * | 3/2000 | Fisher et al. ................ | 717/178 |
| RE37,431 E | * | 10/2001 | Lanier et al. ................. | 706/58 |
| 6,298,443 B1 | * | 10/2001 | Colligan et al. ............ | 713/200 |
| 6,347,371 B1 | * | 2/2002 | Beelitz et al. ................ | 713/2 |

OTHER PUBLICATIONS

Cache–based pipeline architecture in the Hitachi H32/200 32–bit microprocessor Nishimukai, T.; Inayoshi, H.; Takagi, K.; Iwasaki, K.; Kawasaki, I.; Hanawa, M.; Okada, T.; Computer Design: VLSI in Computers and Processors, 1988. IEEE, pp. 102–105.*

A 64 b RISC microprocessor for a parallel computer system Kaneko, K.; Okamoto, T.; Nakajima, M.; Nakakura, Y.; Gokita, S.; Nishikawa, J.; Tanikawa, Y.; Kadota, H.; Solid–State Circuits Conference, 1989. IEEE pp. 78–79, 296.*

A 400 MHz, 144 Kb CMOS ROM macro for an IBM S/390–class microprocessor Tuminaro, A.; Computer Design: VLSI in Computers and Processors, 1997. ICC '37. Proceedings., 1997 IEEE International Conference on, Oct. 12–15, 1997 □□pp. 253–255.*

An embedded stack microprocessor for SDH telecommunication applications Stadler, M.; Thalmann, M.; Rower, T.; Felber, N.; Fichtner, W.; Custom Integrated Circuits Conference, 1998., Proceedings of the IEEE 1998, May 11–14, 1998 □□pp. 17–20.*

Generation of m–sequence using Microchip PIC16C84 Rizk, M.R.M.; Eletlety, M.H.; Radio Science Conference, 1998. NRSC '98. Proceedings of the Fifteenth National, Feb. 24–26, 1998 pp. C4/1–C/48.*

An embedded 16–bit microprocessor Young–Ho Cha; Chang–Su Park; Gyeong–Yeon Cho; Hyek–Hwan Choi; ASICs, 2000. AP–ASIC 2000. Proceedings of the Second IEEE Asia Pacific Conference on, Aug. 28–30, 2000 pp. 335–338.*

\* cited by examiner

*Primary Examiner*—Wilbert L. Starks, Jr.
*Assistant Examiner*—Michael B. Holmes
(74) *Attorney, Agent, or Firm*—Scott Charles Richardson; Chad W. Swantz

(57) ABSTRACT

The present invention is directed to a system and method for CMOS integration. A method of integrating CMOS within a product based on a received order includes receiving an order for a product having a desired configuration. The product is identified for CMOS loading, wherein the product is loaded with custom CMOS code created in accordance with the ordered desired configuration. Thus, the product corresponding to the order may be produced having the desired configuration.

21 Claims, 12 Drawing Sheets

SYSTEM AND METHOD FOR CMOS INTEGRATION

CROSS REFERENCE TO RELATED APPLICATION

The present application is a Continuation-in-Part of U.S. patent application Ser. No. 09/630,404 filed Aug. 2, 2000, pending. Said U.S. patent application Ser. No. 09/630,404 is a Continuation-in-Part of U.S. patent application Ser. No. 09/562,870 filed May 1, 2000 (now abandoned), which is a Continuation-in-Part of U.S. patent application Ser. No. 09/090,118 filed Jun. 4, 1998, now U.S. Pat. No. 6,080,207 issued Jun. 27, 2000.

Said U.S. patent application Ser. No. 09/630,404 is also a Continuation-In-Part of International Patent Application Serial Number PCT/US99/08095, international filing date Apr. 13, 1999, pending. Said U.S. patent application Ser. No. 09/630,404, said U.S. patent application Ser. No. 09/090,118, Patent Cooperation Treaty Application PCT/US99/08095 and U.S. patent application Ser. No. 09/562,870 are herein incorporated by reference in their entirety.

The present application also claims the benefit of U.S. Provisional Application No. 60/247,461 filed on Nov. 9, 2000. Said U.S. Provisional Application No. 60/247,461 is hereby incorporated by reference.

The following patent applications are also incorporated by reference in their entirety:

| Attorney Docket No. | Filing Date | Serial Number |
| --- | --- | --- |
| GW 97-0506A | Aug. 2, 2000 | 09/631,641 |
| GW 97-0506B | Aug. 2, 2000 | 09/631,088 |
| GW 97-0506D1 | Aug. 2, 2000 | 09/631,081 |
| GW 97-0506D2 | Aug. 2, 2000 | 09/630,404 |
| GW 97-0506D4 | Aug. 2, 2000 | 09/631,085 |

FIELD OF THE INVENTION

The present invention generally relates to the field of CMOS assembly and manufacture, and particularly to a system and method for CMOS integration.

BACKGROUND OF THE INVENTION

The production and assembly of products has become increasing more competitive. For example, manufacturers of information handling systems, such as typical computer systems, convergence systems, digital information appliances, Internet appliances, personal digital assistants, and the like, must offer a variety of consumer choices to compete in a modern market. However, the provision of these multiple choices increases the complexity and therefore the cost of the manufacturing process. For instance, a manufacturer must supply a production process for each option, maintain an inventory of parts, manage packaging and shipping, and the like. The management of these diverse tasks may result in great inefficiencies as the overhead is increased with the addition of each option.

Previous methods utilized to address this problem resulted in great bureaucracies and costs. Consumers, selecting from a variety of product options, may arrive at a diverse variety of products. To produce these products, the manufacturer must determine the parts required, determine availability of parts, stock the parts, and derive a production process for actually assembling and producing the product. Each of these tasks required transferring corresponding work orders to various production groups, at which time the work order was received, option located, and then installed. However, the time requirements of operating such a system may be unsuitable in modern operations where inventory must remain low while providing quick assembly.

Specifically relating to the manufacture of computing systems, a desired configuration will comprise assembled hardware components configured to cooperate as a computing system. Specific to each such configuration is the setting of values from the computer system's BIOS or basic input/output system. These values enable the system to recognize and communicate with its assembled hardware components. As is known to those of skill in the art, BIOS values specific to the system configuration are set and stored in what is commonly called CMOS, referring to complementary metal-oxide semiconductor, which is a particular technology permitting the storage of system critical information even when power is removed from the system. While the terms "CMOS" and "CMOS code" will be used to refer to these values throughout this specification, it will be appreciated by those of skill in the art that this term as used herein refers to non-volatile, settable BIOS values generally and is not limited only to complementary metal-oxide semiconductor technology.

The particular CMOS settings of a system depend upon a number of parameters that are determined in turn by the component configuration of the system, including the size and configuration of a hard disk drive, the size and type of random access memory in the system, serial and parallel port addressing in the system, and the like. In circumstances where a number of different component configurations are possible, as is common in build-to-order manufacturing, it becomes necessary to determine and set each system's CMOS settings accordingly. Therefore, it would be desirable to provide an integration system and method for determining and setting CMOS based upon an order for a product having a desired configuration.

SUMMARY OF THE INVENTION

Accordingly, the present invention is directed to a system and method for integration of CMOS. In a first aspect of the present invention, a method of integration of CMOS includes receiving an order for a product having a desired configuration. A CMOS integration method is applied to the desired configuration to generate CMOS code. Upon identification of product for CMOS loading, custom CMOS code is loaded into the specific product. Thus, the product corresponding to the order may be produced having the desired configuration.

In a second aspect of the present invention, a system for integration of CMOS based on a received order includes a receiver for receiving an order coupled to a network, the receiver suitable for receiving an order for a product having a desired configuration. A generator suitable for generating the desired configuration is coupled to the receiver. A CMOS integration process is coupled to the configuration generator, the CMOS integration process includes applying rules for CMOS formation to the configuration to generate CMOS code. When the product for CMOS loading is identified, custom CMOS code is loaded into the product corresponding to the order having a desired configuration.

In a third aspect of the present invention, a system for integrating CMOS with a product based on a received order includes a processor for executing a program of instructions on the system. A memory is coupled to the processor, the memory suitable for storing the program of instructions executable by said processor; wherein the program of instructions configures the system to receive an order for a product having a desired configuration. Rules for CMOS formation are applied to generate CMOS code. The product identified for CMOS loading is then loaded with custom CMOS code so that the product corresponding to the order may be produced having the desired configuration.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the scope of the present inventions. The following detailed description is, therefore, not to be taken in a limiting sense. Reference will now be made in detail to the presently preferred embodiments of the invention, examples of which are illustrated in the accompanying drawings.

Referring generally now to FIGS. 1 through 8, exemplary embodiments of the present invention are shown. The present invention may aid in the efficient production of a variety of different products, and it should be realized that although the production of an information handling system is disclosed, the present invention contemplates other products without departing from the spirit and scope thereof.

Figure 1:
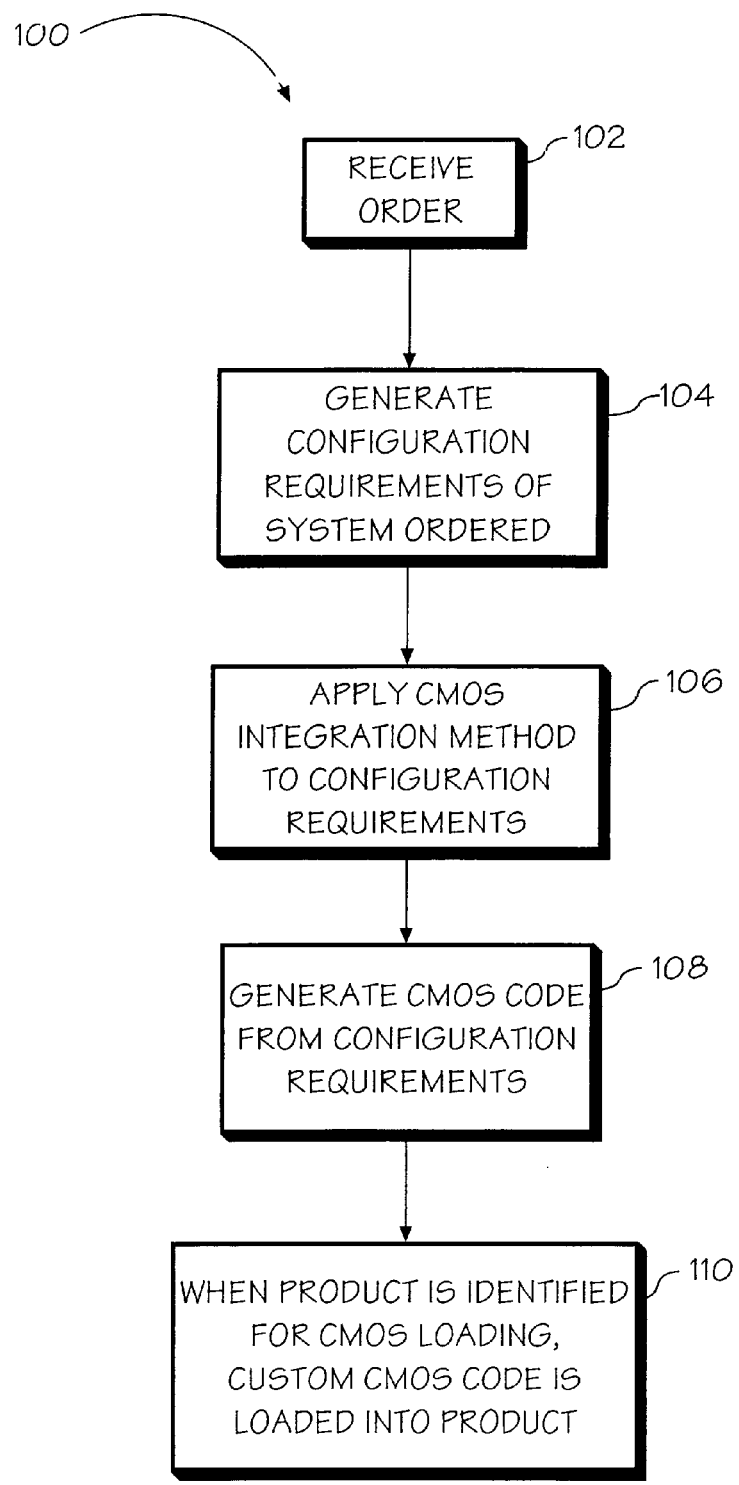
FIG. 1 is a flow diagram depicting an exemplary embodiment of the present invention wherein the CMOS code are generated from the configuration of an ordered product.

Referring now to FIG. 1, an exemplary embodiment 100 of the present invention is shown. An order is received into the system 102. The desired order configuration is then generated based on the system ordered 104. A CMOS integration method 106 is utilized so as to generate the required CMOS code 108. Thus, when a product is identified for assembly, custom CMOS code is loaded into the product to produce the product in the configuration specified 110. In this way, the present invention is able to produce a variety of configurations as desired by a consumer in an efficient manner.

Figure 2:
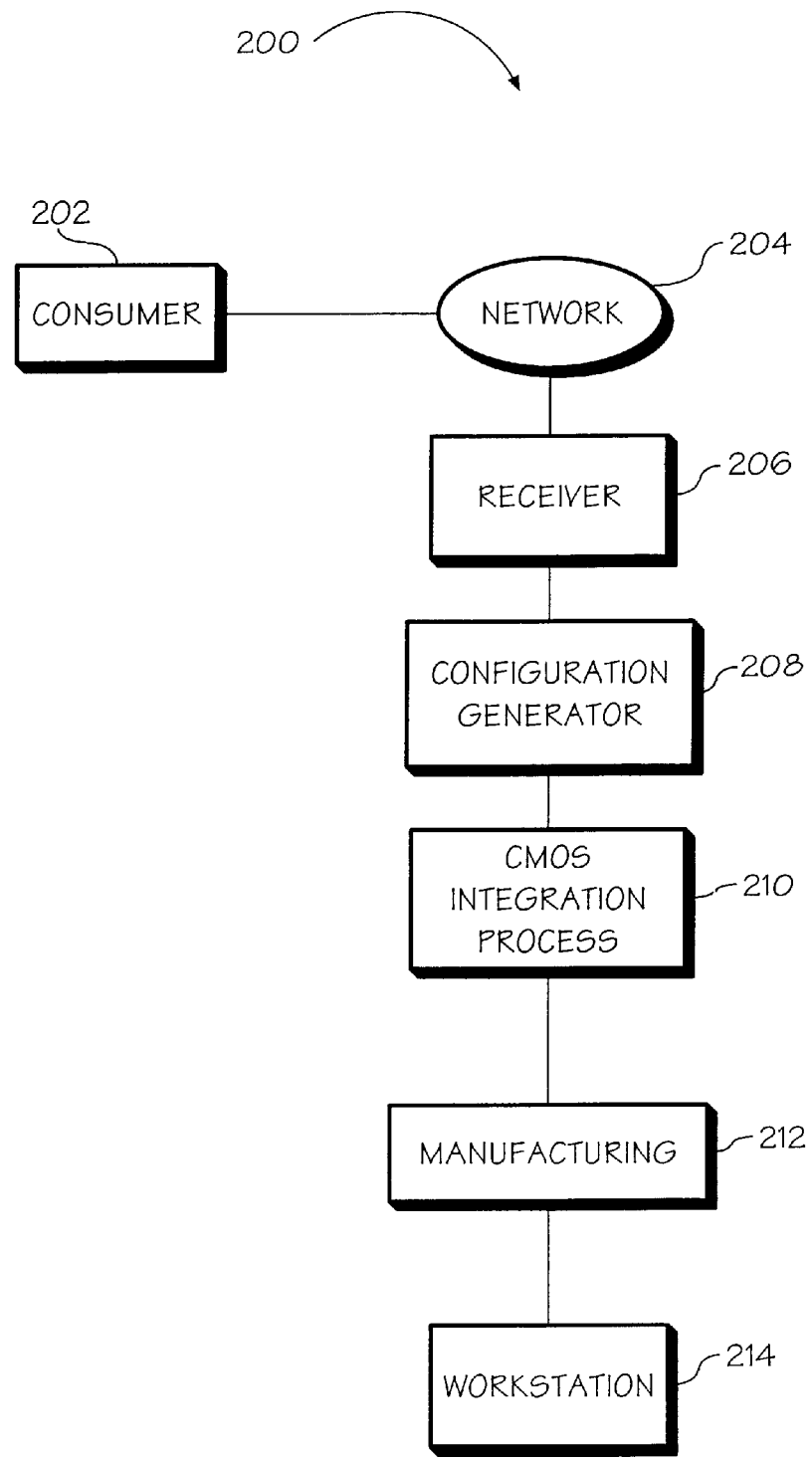
FIG. 2 is a block diagram depicting an exemplary embodiment of the present invention wherein a consumer accesses a system of the present invention over a network.

Referring now to FIG. 2, an exemplary embodiment 200 of the present invention is shown wherein a block diagram depicts a system of the present invention. A consumer 202 may interact over a network 204 with a receiver 206 suitable for receiving an order for a product having a desired configuration. A configuration generator 208 is coupled to the receiver 206 for generating the desired configuration. A CMOS integration process 210 is coupled to the parts list generator 208, the CMOS integration process suitable for applying a CMOS formation method to the configuration to generate CMOS code. A manufacturing process 212 that may include a workstation 214 may be coupled to the CMOS integration process 210 for transfer and loading of custom CMOS code into a product to obtain the desired configuration.

Figure 3:
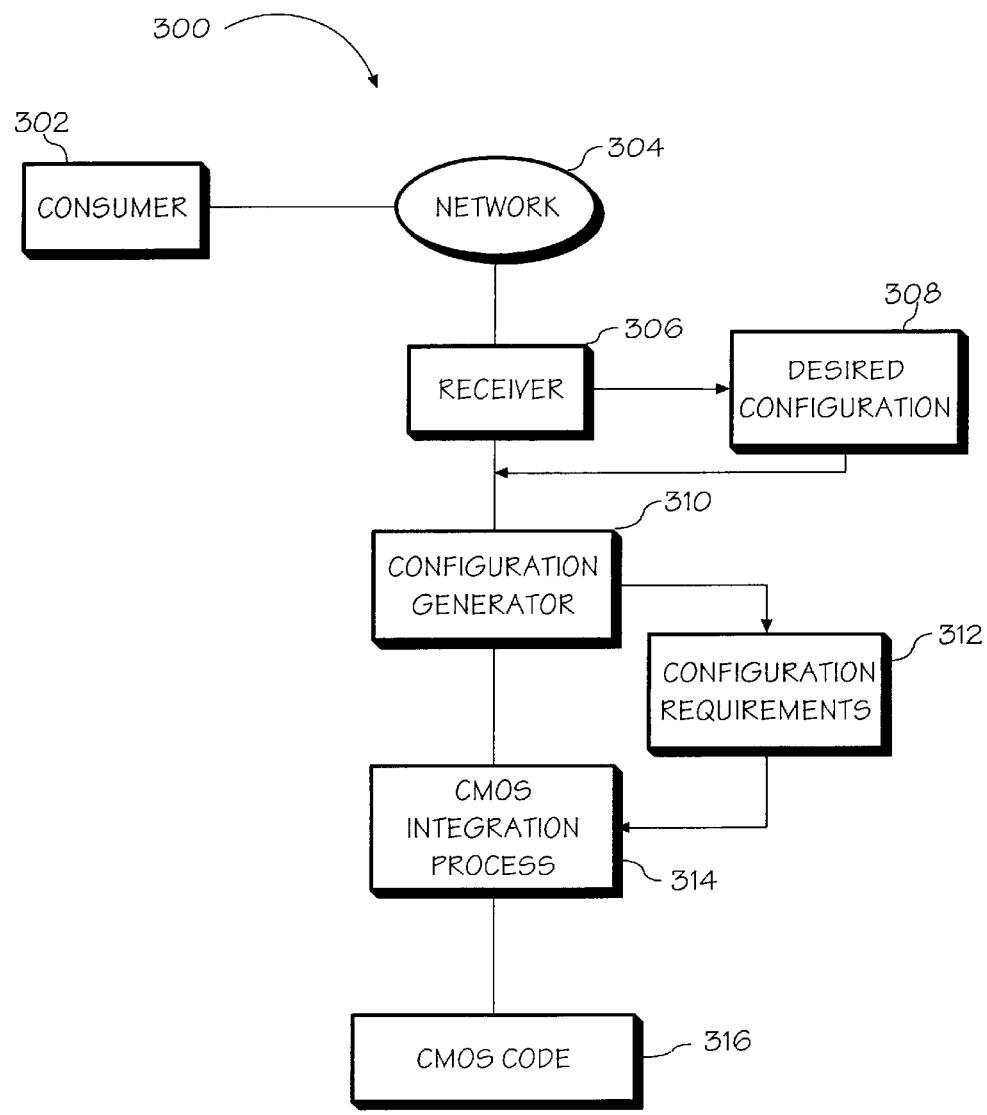
FIG. 3 is a block diagram illustrating an exemplary embodiment wherein a consumer accesses a system capable of receiving a customized product and CMOS code are generated based on the customized order.

Referring now to FIG. 3, an exemplary embodiment of the present invention is shown. A consumer 302 accessing a network 304, such as the Internet and World Wide Web, accesses a receiver 306, such as a Web site. The consumer 302 interacts with the receiver 306 to choose a desired product. The receiver 306 acquires the desired configuration 308 and transfers that information to a configuration generator 310. The configuration generator 310 analyzes the desired configuration 306 to arrive at configuration requirements 312 for the desired configuration 308. The configuration requirements 312 are then transferred to a CMOS integration process 314. The CMOS integration process 314 takes the configuration requirements list 312 and generates CMOS code 316 so as to orchestrate the production of the desired configuration 308. The CMOS code 316 is sent to manufacturing 320. At this point, the product identified for CMOS loading is loaded with custom CMOS code 322.

In one embodiment, the system is a minicomputer. A minicomputer includes a multi-processing system capable of supporting from four to about two hundred users simultaneously. Minicomputers are well known to those skilled in the art. For example, an IBM AS/400 minicomputer may function as the receiver 306 (FIG. 3) in one embodiment. In terms of size and power, a minicomputer falls between a workstation and a mainframe. Equivalent inputting methods are contemplated as alternatives to using a minicomputer, such as the use of a workstation, mainframe, or other information handling system.

Figure 4:
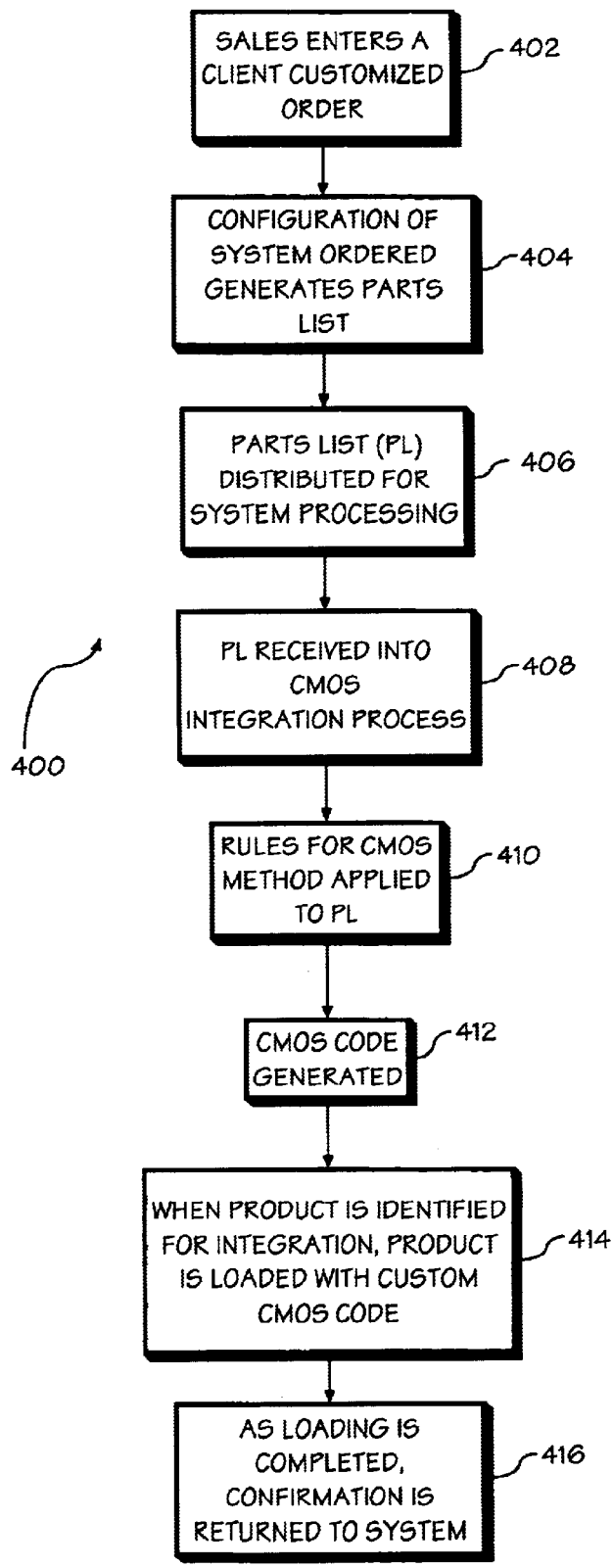
FIG. 4 is a flow diagram depicting an exemplary embodiment wherein the configuration of an ordered system is utilized to generate CMOS code including confirmation of the completion of loading of the CMOS code.

Referring now to FIG. 4, an exemplary method 400 of the present invention is shown wherein an order received by a salesperson is entered into a CMOS integration system. A sales associate, such as a person in a call center, receives a sales call and enters the desired configuration into the system 402. The configuration of the system ordered is utilized to generate the configuration requirements 404. The parts list is then distributed for system processing 406 and received into a CMOS integration process 408. The CMOS integration process applies rules of CMOS formation to the parts list 410. Thus, CMOS code is generated for manufacture of the customized order 412. When product is identified for integration, custom CMOS code is loaded 414. As loading of custom CMOS code is completed, confirmation is returned to the system 416. In this way, an information handling system corresponding to the order may be produced having the desired configuration.

Figure 5:
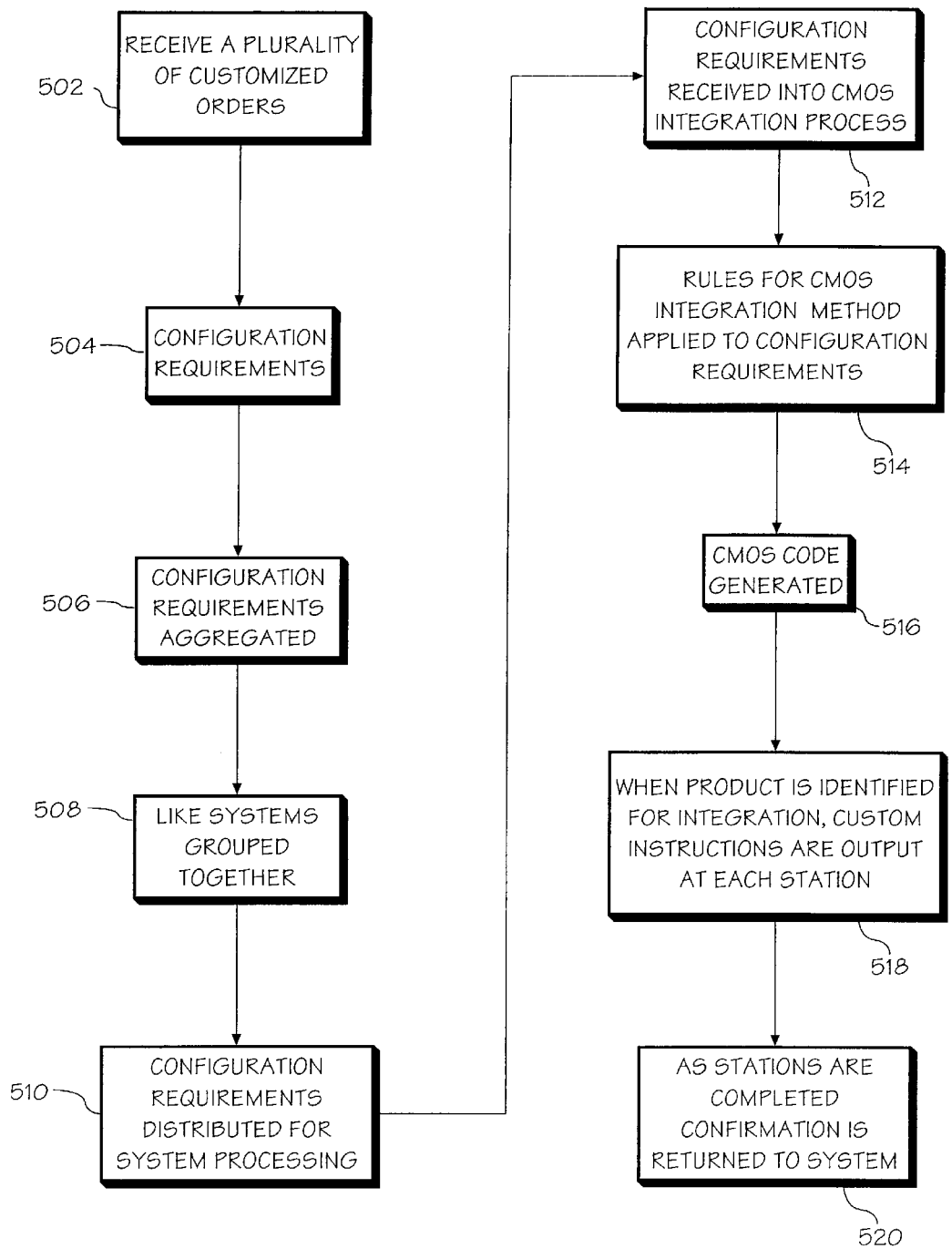
FIG. 5 is a flow diagram illustrating an additional exemplary embodiment of the present invention wherein the configuration of a plurality of order systems is utilized.

Referring now to FIG. 5, an additional exemplary embodiment 500 of the present invention is shown wherein a CMOS integration system includes grouping of like orders together based on similar configurations. Grouping like orders together may allow for increased efficiency due to the commonality between orders. For example, a system may receive a plurality of customized orders involving a variety of consumer options 502. The configuration of the system ordered generates the configuration requirements 504. The plurality of components are aggregated 506 and like systems are grouped together 508. The configuration requirements are distributed for system processing 510. Once the configuration requirements are received into a CMOS integration process 512, rules for a CMOS integration method are applied to the configuration requirements 514. CMOS code is generated from the configuration requirements 516. Thus, when a product is identified for loading, custom CMOS code is loaded into the product 518. Further, by grouping like systems together, the performance of the CMOS code may be optimized. For example, the grouping may be performed for like components, like assembly processes, quantities of like parts, and the like. It may also be preferable to receive a confirmation from the assembly station 520 so that performance of the CMOS code may be monitored.

Figure 6:
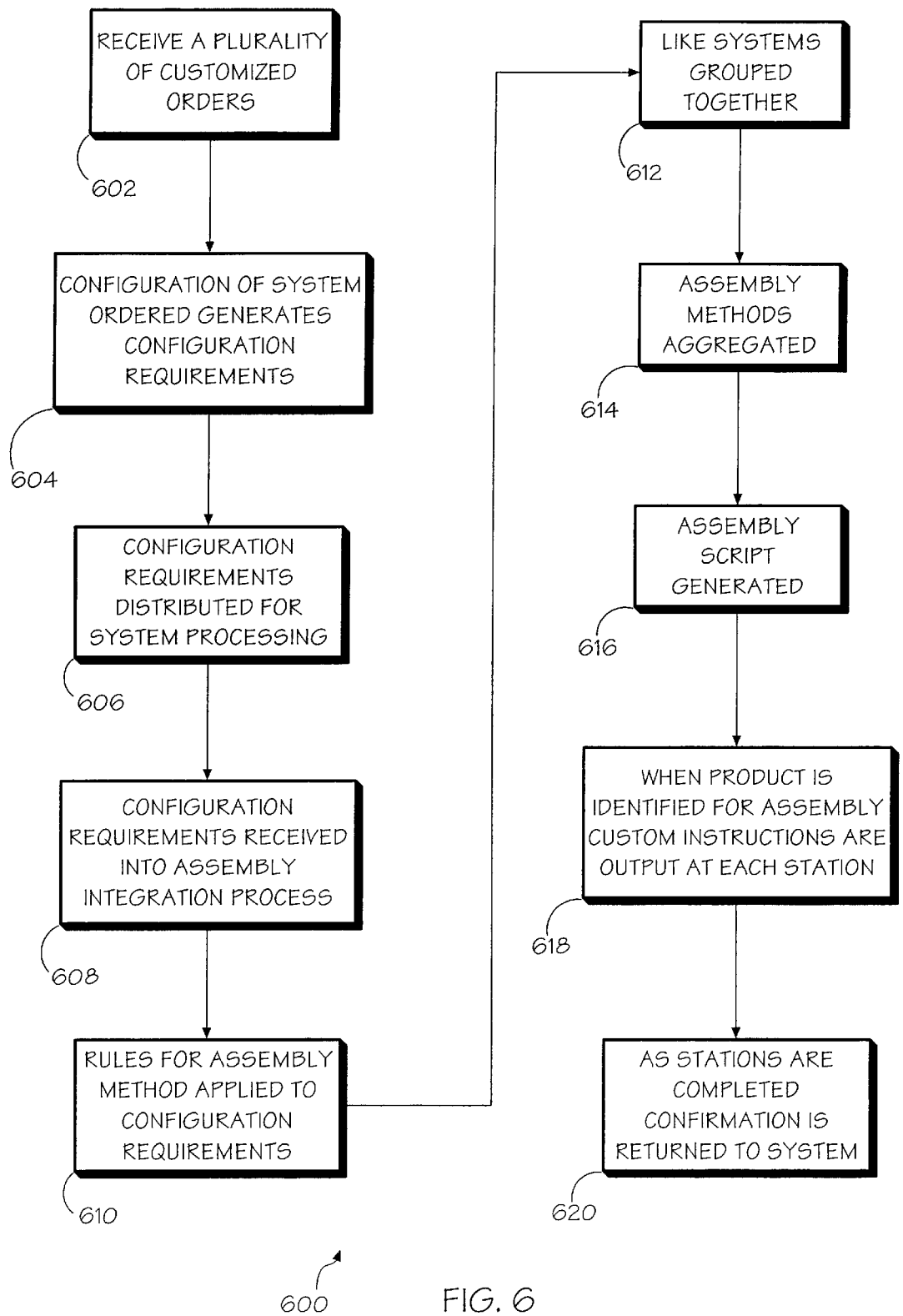
FIG. 6 is a flow diagram depicting an additional exemplary embodiment of the present invention wherein the configuration of a plurality of ordered systems is grouped by an integration method to produce CMOS code based on like integration requirements.

Referring now to FIG. 6, an additional exemplary embodiment 600 of the present invention is shown wherein a CMOS integration system includes grouping like orders together for optimized integration. Pluralities of customized orders are received by the system 602 and the configuration of the system ordered is utilized to generate the configuration requirements 604. The configuration requirements are then distributed for system processing 606 and received into a CMOS integration process 608. The rules for the CMOS integration method are applied to the configuration requirements 610 including grouping like system requiring like CMOS processes together 612. Thus, like systems involving like CMOS methods are aggregated together 614 to maximize the CMOS integration process. CMOS code is generated 616 applying the rules for the CMOS integration method and the aggregated like system. Thus, when a product is identified for loading, custom CMOS code is loaded into product 618 and confirmation of the completion of loading is returned to the system 620.

Referring now to FIGS. 7A, 7B, 7C and 7D, exemplary embodiments of the present invention are shown wherein a plurality of users choosing from a plurality of customizable options for a product. For instance, the consumer, accessing a receiver over a network connection, as shown in FIGS. 2 and 3, may select from a plurality of options to configure a desired product, such as an information handling system. The user may utilize data entry screens, such as the examples shown in FIGS. 7A and 7B, to select from a variety of option choices to enter the data into the receiver. By offering a variety of options, the overhead of producing the product may be greatly increased.

Figure 7A:
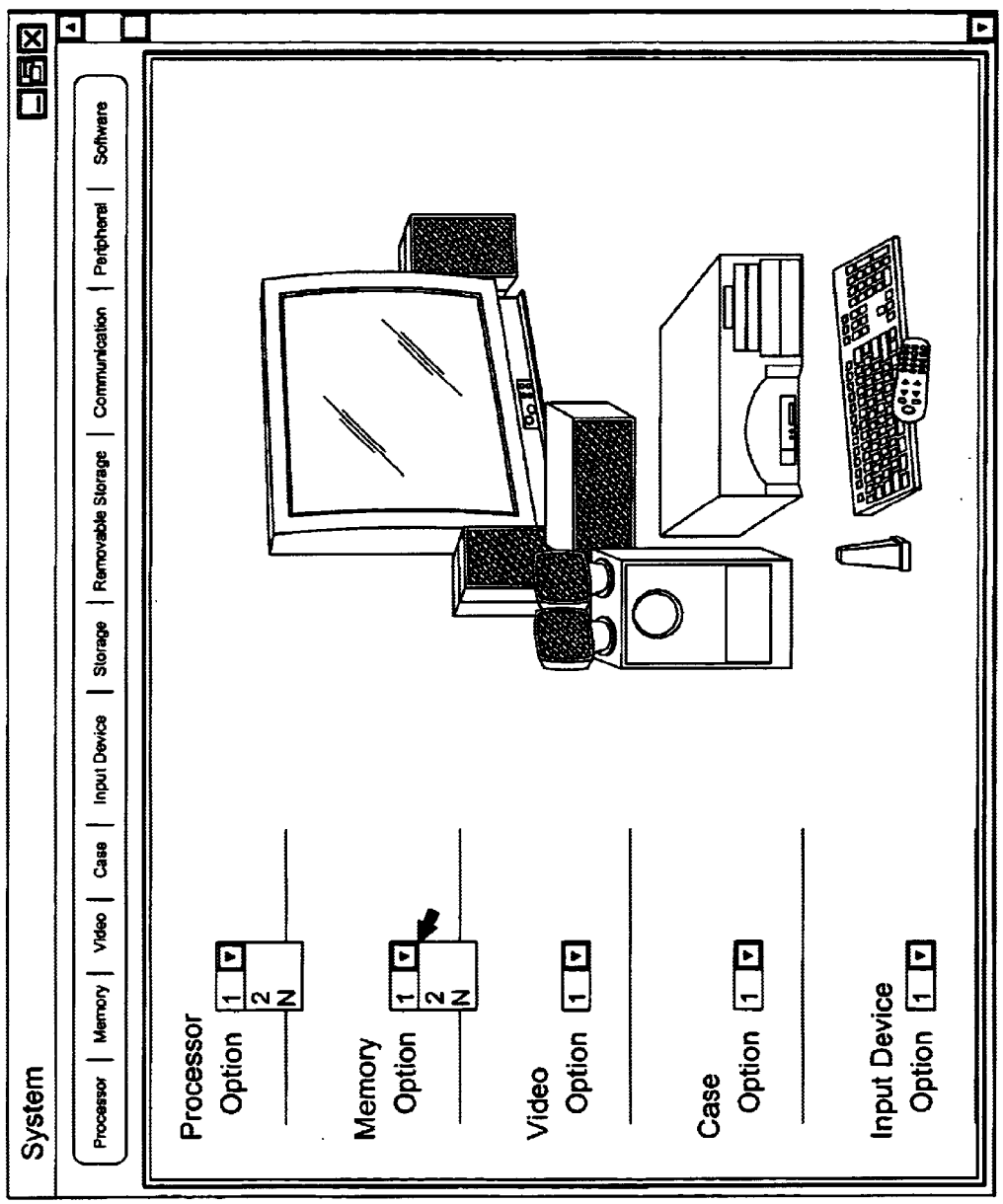
FIGS. 7A and 7B illustrate exemplary data entry screens of the present invention wherein a user may enter data on a receiver.
Figure 7B:
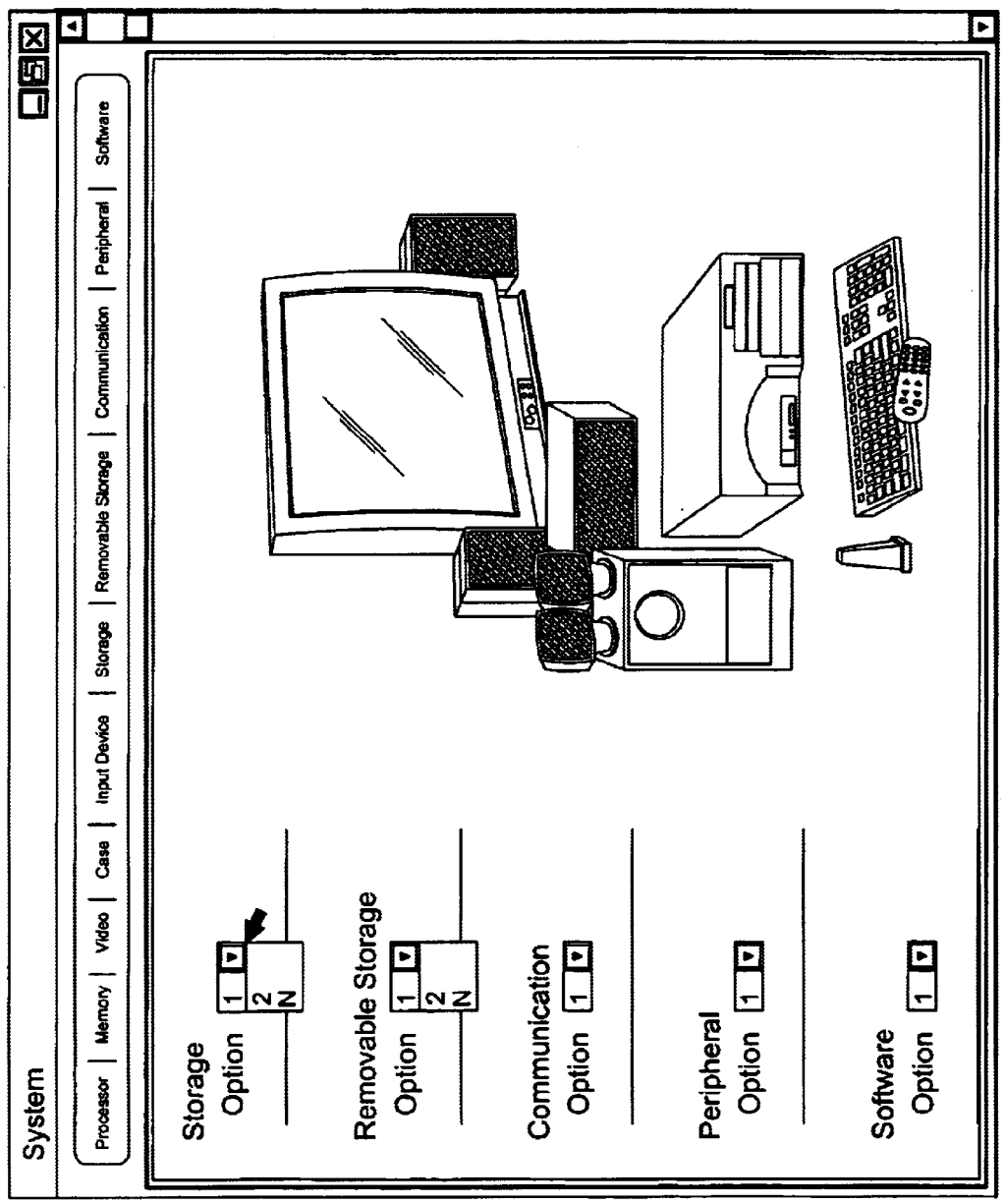
Figure 7C:
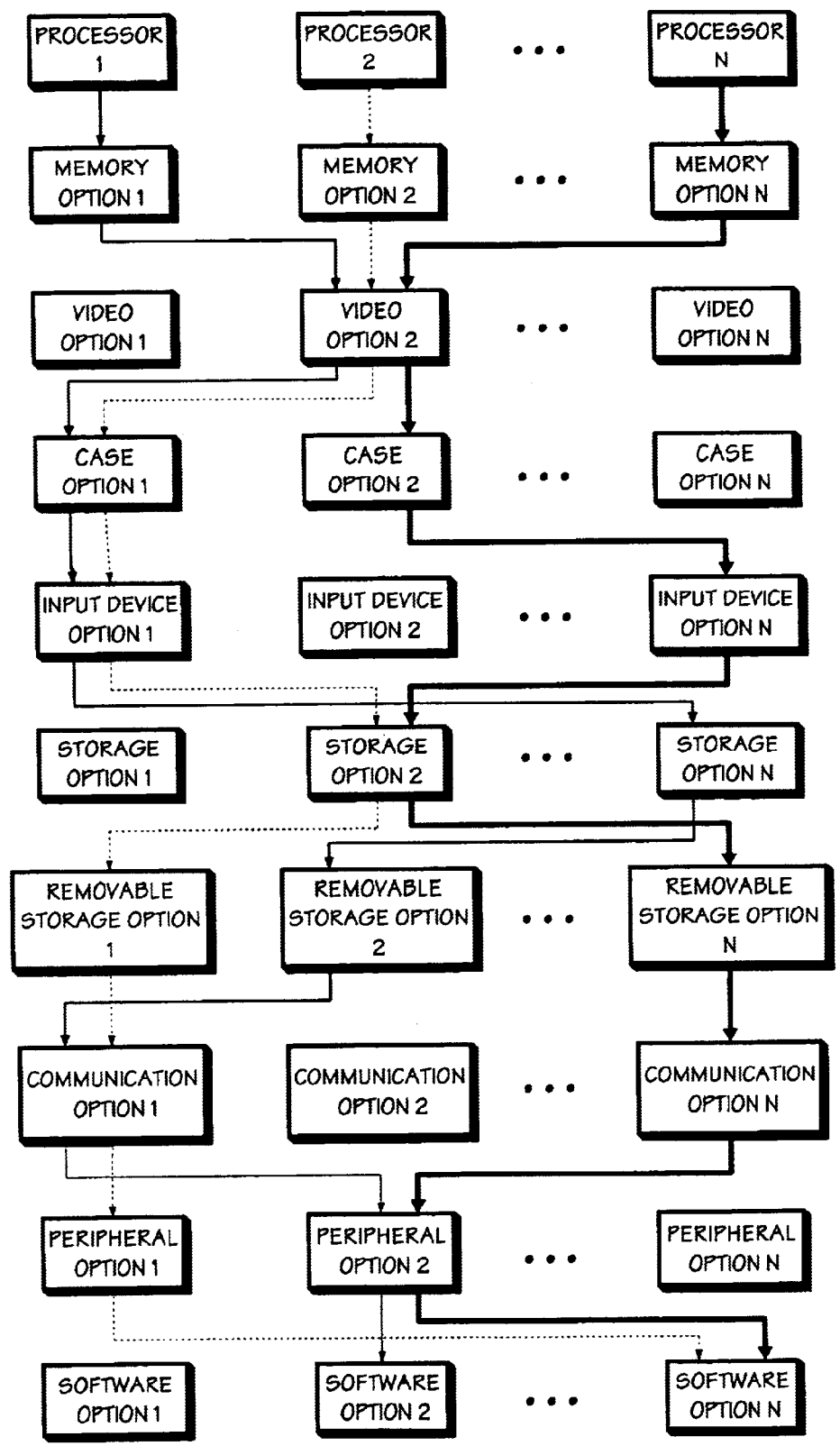
FIG. 7C is a block diagram depicting an exemplary embodiment wherein a plurality of option choices suitable for being chosen by a plurality of users.

Referring now to FIG. 7C, an exemplary embodiment 700 of the present invention is shown wherein a plurality of users choosing from a plurality of customizable options for a product is shown. A consumer, accessing a receiver over a network connection, as shown in FIGS. 2 and 3, may select from a plurality of options to configure a desired product, such as an information handling system. For example, a first consumer as denoted by a light weight line 702, a second consumer as denoted by a dashed line 704, and a third user as denoted by a heavy weight line 706, may select from different processor options 708, 710 and 712 from a plurality of processors. Thus, as the first consumer 702 selects between memory, video, case, input device, storage, removable storage, communication, peripheral, software, and the like, these choices are input to the receiver. A second consumer 704 also choosing from the variety of choices, such as processor, memory, video, case, input device, storage, removable storage, communication, peripheral, software, and the like, inputs this information into the receiver. Similarly, the third consumer 706 also chooses from the variety of choices, such as processor, memory, video, case, input device, storage, removable storage, communication, peripheral, software, and the like also has the choices input into the receiver. With each selection made, CMOS code must be generated in order for a computing system to recognize the device. As is readily apparent, providing a wide variety of choices has the necessary consequence of increased variety of CMOS code needed to support all of the choices. However, by grouping like systems together, the production of these systems may be accomplished in an improved and efficient manner.

Figure 7D:
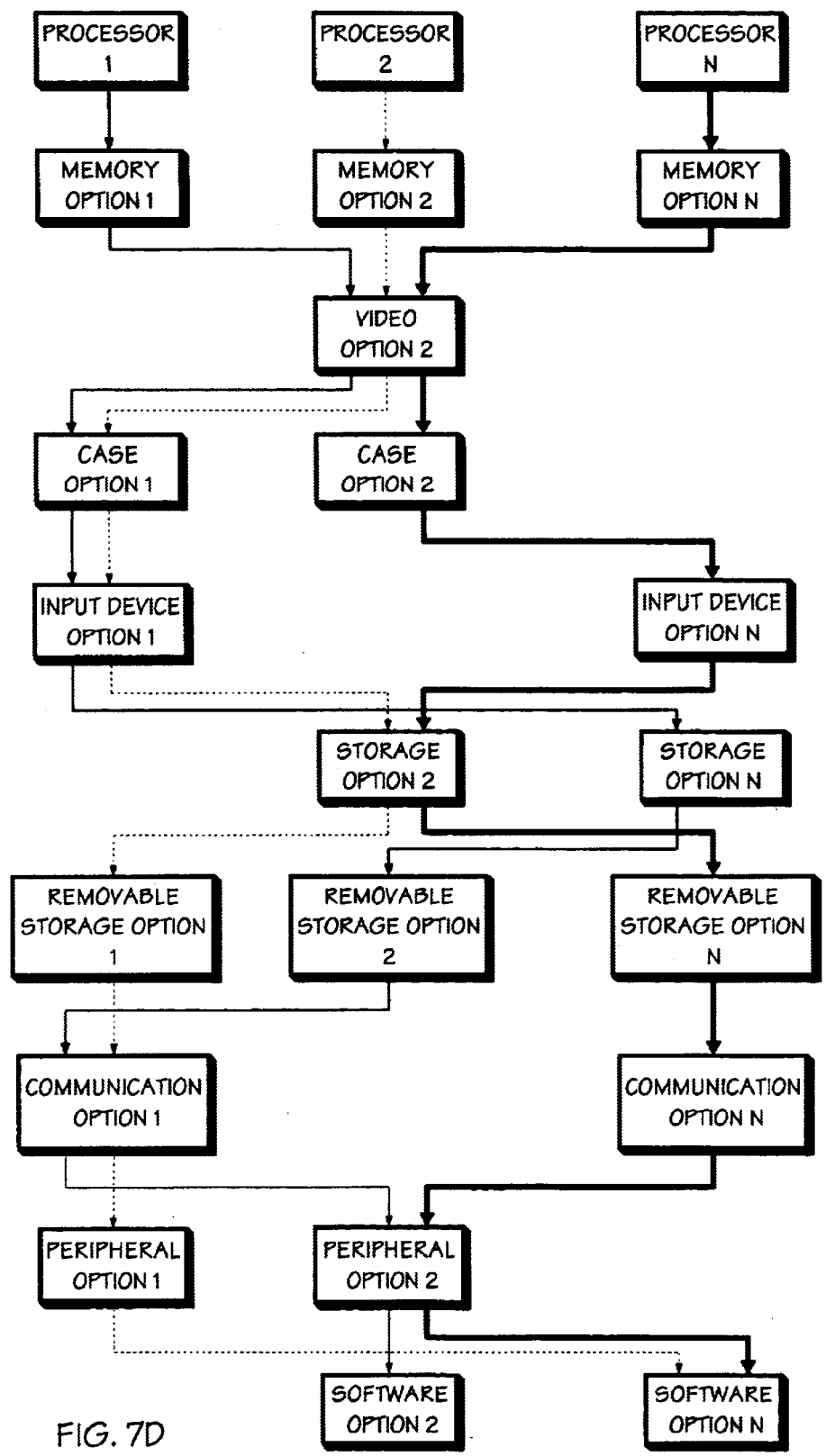
FIG. 7D is a block diagram further illustrating the exemplary embodiment as shown in FIG. 7C wherein the choices chosen by three users are shown.

Referring now to FIG. 7D, an exemplary embodiment of the present invention, as shown in FIG. 7C, is illustrated wherein consumer selections from a variety of options are shown. A plurality of consumers selecting from a variety of options may select similar options. For example, a first consumer 702 may select certain options similar to the options chosen by a third consumer 706, such as video option two 714 and peripheral option two 716. Additionally, a second consumer 704 may select options in common with the third consumer 706, such as video option two 714, storage option two 716, and software option "n" 720. Similarly, the first consumer may select options in common with the second consumer 706, such as video option two 714, case option one 722, input device option one 724, and communication option one 726. Thus, the first consumer 702 and the second consumer 704 have the most choices in common. Grouping the first consumer 702 and the second consumer 704 together may increase the efficiency of the CMOS integration process by loading similar CMOS installing the similar components. It may also be preferable to further extend the grouping as the similarities continue to further increase the efficiency of the process. For instance, product one chosen by consumer one may be produced first and the next most similar product, chosen by consumer two, next, followed again by the product most similar to product two, in this example chosen by consumer three. This hierarchical ordering based on similarity of options chosen may allow the products to be produced in an improved and more efficient manner.

Figure 8:
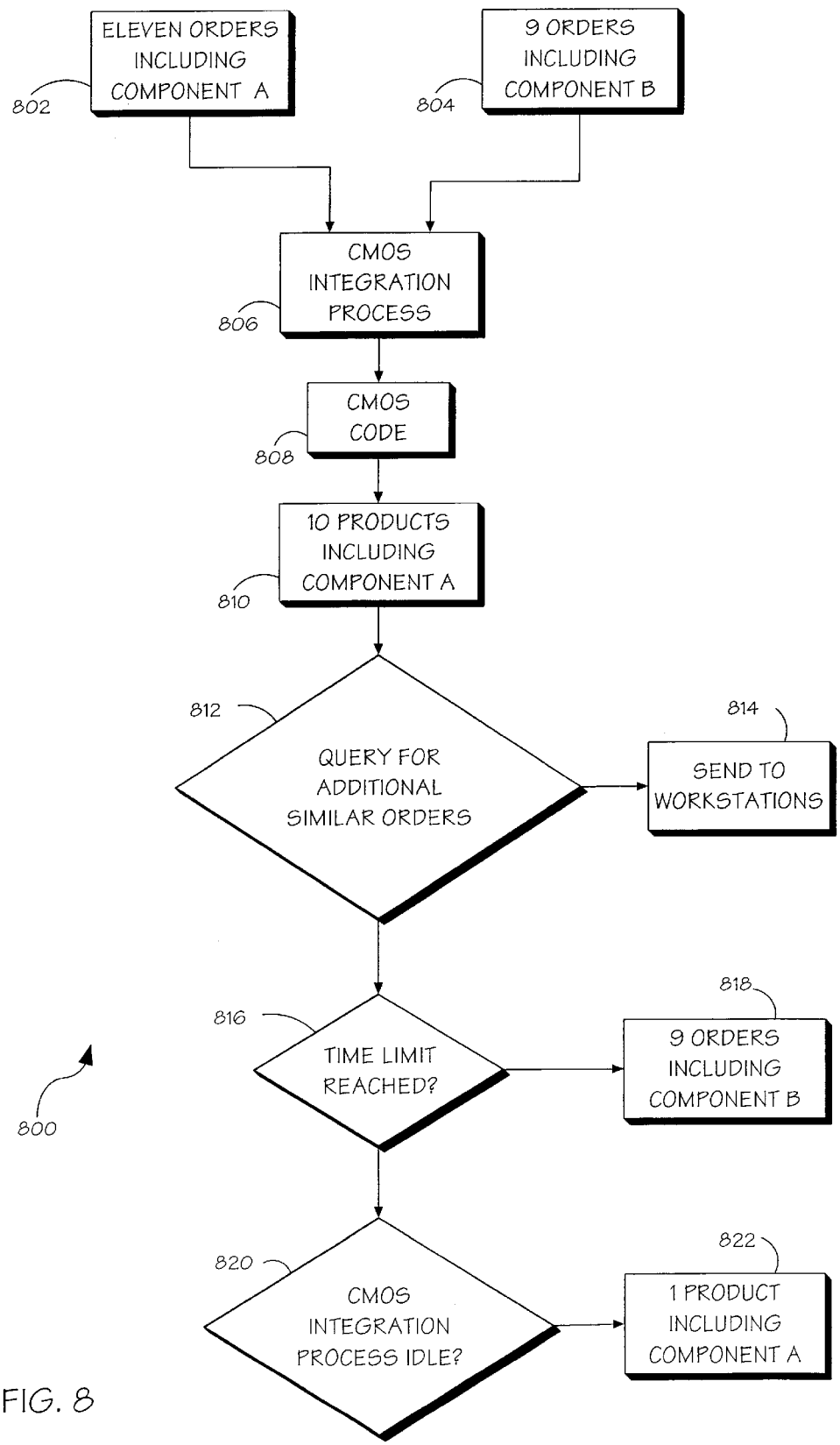
FIG. 8 is a flow diagram illustrating an additional exemplary embodiment of the present invention wherein a CMOS integration process groups orders based on parts groupings, includes time limitations and queries the integration process to further increase efficiency of the present invention.

There are a wide variety of groupings based on commonality between orders that are contemplated by the present invention without departing from the spirit and scope thereof. For example, it may be preferable to perform groupings based on units of supplied components, as shown in FIG. 8. Rules for a CMOS integration process as applied to the configuration requirements as discussed in conjunction with FIGS. 4, 5 and 6, may include information related to component quantities. Thus, it may be preferable to perform the CMOS integration process based on groupings corresponding to the typically encountered groupings of components so that the CMOS integration process may be performed in an efficient manner. For example, in an exemplary embodiment 800 a system of the present invention may receive eleven orders for information handling systems including component A 802 and nine orders for information handling system including component B 804. These orders may be forwarded to a CMOS integration process 806 wherein CMOS code is derived 808. In this instance, components A and part B are typically purchased and/or transported in groups of ten, such as ten components to a box. Thus, when deriving CMOS code 808, the system will group the items based on the groupings of the components, so that when the ten orders are received for component A the CMOS code for producing those orders is initiated 810 to produce those ten corresponding products. While those ten products are being produced, the system may still continue to query for additional similar orders 812 and continue to produce groupings. For example, if an additional order including part B was encountered, the preferable unit grouping would be reached and that CMOS code may then be sent to be performed at a workstation 814.

In some applications, such as those involving batch manufacturing, it may also be preferable to incorporate a time limitation so that products are produced in a timely fashion, such as 24 hours and the like as contemplated by a person of ordinary skill in the art. If this time limitation is reached 816, those products may then be produced in a timely fashion 818. Additionally, it may also be preferable to insure that the system continues producing products to further maximize the efficiency of the system. Thus, if the CMOS integration process is idle 820, any further orders waiting for production may be initiated regardless of the groupings, such as the remaining product including part A 822 that was initially received 802. Although exemplary groupings and products are described in this embodiment, it should be appreciated that a wide variety of products and groupings are contemplated by the present invention without departing from the spirit and scope thereof. For example, it may be preferable to group products based on similar production requirements, regardless of the components necessary in the performance of the process.

Figure 9:
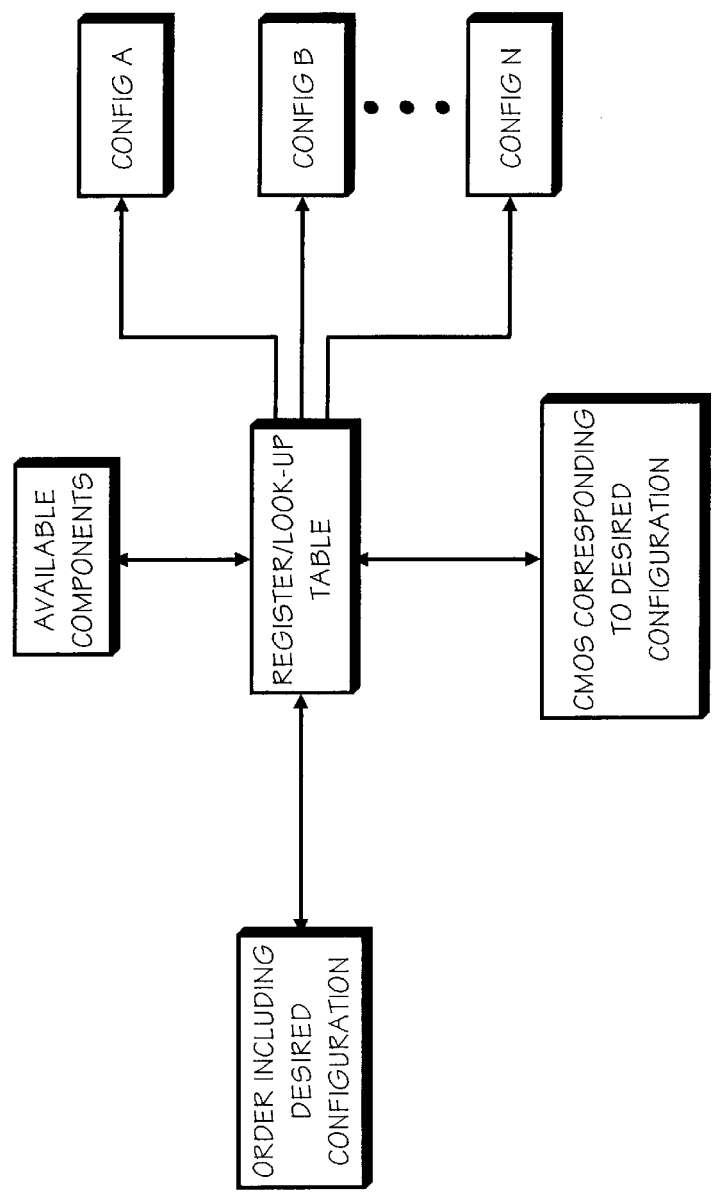
FIG. 9 depicts an alternative embodiment of a CMOS integration system of the present invention.

Referring now to FIG. 9, an alternative embodiment of a CMOS integration system 900 of the present invention is shown. An order which may include a desired configuration may be received and processed. A register/lookup table of the present invention may be capable of accessing a list of available components to produce a desired configuration. Based upon the desired configuration selected by a consumer and the available components, several CMOS code configurations A through N may be available. The register/lookup table of the present invention may select the CMOS code configuration corresponding with the desired configuration.

It is believed that the system and method for CMOS integration of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of integrating CMOS into a product based on a received order, comprising:

receiving an order for a product having a desired configuration;

applying CMOS integration instructions for said desired configuration to generate CMOS code; and identifying the product for CMOS loading, wherein the product is loaded with custom CMOS code so that the product corresponding to the order has desired configuration.

2. The method as described in claim 1, wherein a plurality of orders are received, like orders are grouped.

3. The method as described in claim 2, wherein like orders are grouped by applying CMOS integration method wherein products requiring corresponding CMOS integration processes are grouped together.

4. The method as described in claim 3, wherein the CMOS integration method is suitable for arriving at the CMOS code which includes a time limitation.

5. The method as described in claim 1, wherein the order is received over a network.

6. The method as described in claim 5, wherein the order is at least one of input by a representative in response to a received call and input by a user over an INTERNET connection.

7. The method as described in claim 1, further comprising confirming performance of the instruction.

8. A system for integrating CMOS within a product based on a received order, comprising:

a receiver for receiving an order coupled to a network, the receiver suitable for receiving an order for a product having a desired configuration;

a CMOS integration process suitable for applying CMOS integration instructions according to said desired configuration to generate CMOS code; and at least one workstation coupled to the CMOS integration process, said at least one workstation suitable for identifying a product for loading and loading custom CMOS code to said product so that the product corresponding to the order has the desired configuration.

9. The system as described in claim 8, wherein a plurality of orders are received by the receiver, like orders are grouped.

10. The system as described in claim 9, wherein the CMOS integration process applies the assembly method wherein products requiring corresponding assembly processes are grouped together.

11. The system as described in claim 8, wherein the CMOS integration process is suitable for generating CMOS code which includes a time limitation.

12. The system as described in claim 8, wherein the order is received over a network.

13. The system as described in claim 8, wherein the order is at least one of input by a representative in response to a received call and input by a user over an INTERNET connection.

14. The system as described in claim 8, further comprising confirming performance of the instruction.

15. A system for integrating CMOS within a product based on a received order, the system comprising:
- a processor for executing a program of instructions on the system; and
- a memory coupled to the processor, the memory suitable for storing the program of instructions executable by said processor; wherein the program of instructions configures the system to
  - receive an order for a product having a desired configuration;
  - apply a CMOS integration instructions to the desired configuration to generate CMOS code; and
  - identify the product for CMOS loading, wherein the product is loaded with custom CMOS code so that the product corresponding to the order has the desired configuration.

16. The system as described in claim 15, wherein a plurality of orders are received, like orders are grouped.

17. The system as described in claim 16, wherein like orders are grouped by grouping orders according to their similar CMOS integration requirements.

18. The system as described in claim 15, wherein the CMOS integration system is suitable for arriving at CMOS code which includes a time limitation.

19. The system as described in claim 15, wherein the order is received over a network.

20. The system as described in claim 19, wherein the order is at least one of input by a representative in response to a received call and input by a user over an INTERNET connection.

21. The system as described in claim 15, further comprising confirming performance of the instruction.

\* \* \* \* \*